United States Patent [19]

Strobel

[11] 4,322,971

[45] Apr. 6, 1982

[54] CONTROLLING THE THICKNESS OF MOVING WEBS OF MATERIAL

[75] Inventor: Heinrich Strobel, Hanover, Fed. Rep. of Germany

[73] Assignee: Frieseke & Hoepfner GmbH, Erlangen, Fed. Rep. of Germany

[21] Appl. No.: 134,434

[22] Filed: Mar. 27, 1980

[30] Foreign Application Priority Data

Apr. 4, 1979 [DE] Fed. Rep. of Germany ....... 2913879

[51] Int. Cl.³ .............................................. G01B 15/02
[52] U.S. Cl. .................................................... 73/159
[58] Field of Search .............................. 250/306–308; 356/381; 73/159

[56] References Cited

U.S. PATENT DOCUMENTS 3,565,531 2/1971 Kane et al. ........................... 356/381
4,037,104 7/1977 Allport ................................. 250/308

Primary Examiner—James J. Gill
Attorney, Agent, or Firm—Toren, McGeady & Stanger

[57] ABSTRACT

In controlling the thickness of a moving web of material, after it passes through a production station containing a final control element for its thickness, it is moved past a radiometric device which measures the weight of the web per unit area. Downstream from the radiometric device, the web is moved past an optoelectronic device utilizing laser radiation for measuring the thickness of the web. The two measurements are compared and the radiometric device measurement is corrected based on the optoelectronic device measurement and the comparative corrected value is transmitted to a control unit which actuates the final control element in the production station. Preferably, the optoelectronic device is spaced from the production station so that it is out of the range of any significant environmental influences.

4 Claims, 1 Drawing Figure

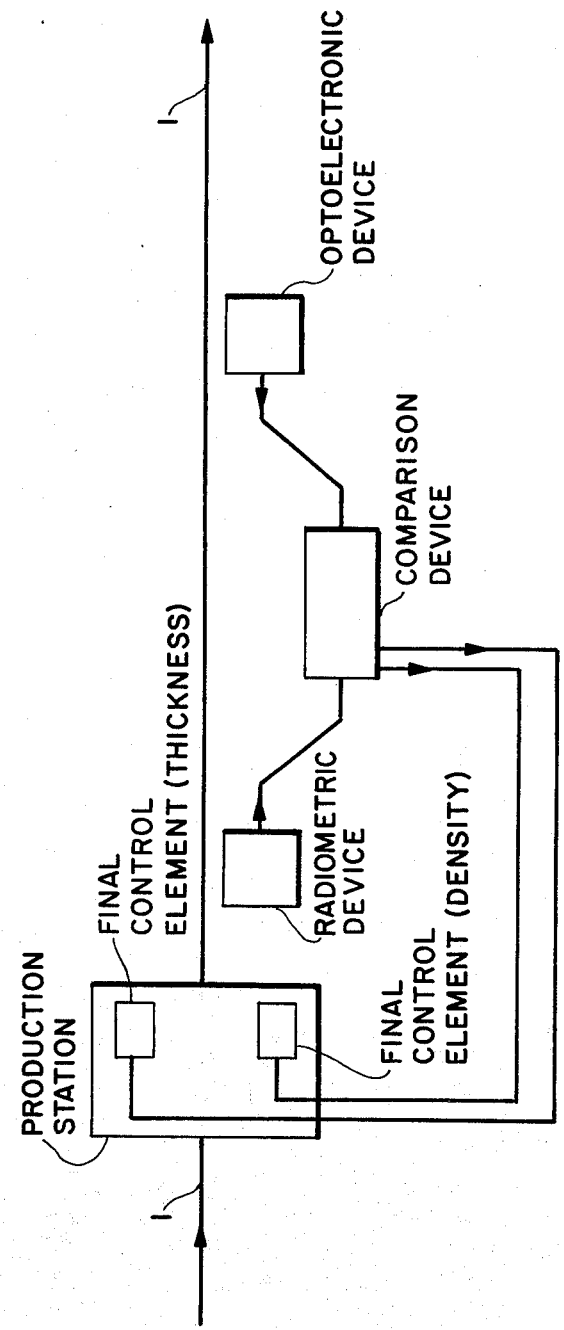

CONTROLLING THE THICKNESS OF MOVING WEBS OF MATERIAL

SUMMARY OF THE INVENTION

The present invention is concerned with controlling the thickness of moving webs or sheets of material to be measured. In addition, the invention is also concerned with controlling the density of the material in the web.

The present invention has as its starting point the known methods of measuring the weight per unit area or the thickness by means of radiometric measuring devices with the thickness being determined by a computation based on the weight per unit area. Such radiometric measuring devices have the disadvantage that the measured result is dependent upon the atomic number of the atoms making up the material to be measured. Accordingly, effective measurements of the weight per unit area or the thickness are possible only when the composition of material remains constant. In the past, the possibility of error had to be expected where the material being measured had a variable composition. Radiometric measuring devices, however, have the advantage that they are more robust and less susceptible to environmental influences. As a result, in the manufacturing operations, the radiometric device can be positioned relatively close to a production station. Therefore, in connection with control units operated by the radiometric device, a very short idle time is achieved by such an arrangement.

In contrast, optoelectronic measuring devices are known which directly measure the thickness of a web independently of its composition. Units of this type normally use laser radiation for effecting the measurements. Such units, however, have the disadvantage that they are more sensitive to environmental influences. These environmental influences have a more direct effect on the measured result in optoelectronic measuring devices than in radiometric devices, because the thickness is measured directly. Optoelectronic devices of this type can be constructed as distance measuring devices for measuring between a fixed reference point and a web of material to be measured which runs over a fixed support, such as a roller. In addition, so-called differential units are known in which the distance to the material to be measured is determined on both sides relative to fixed reference points and the actual thickness value is determined.

In these two types of optoelectronic devices, very accurate measuring dimensions are required for obtaining a useful result. Negative influences can very easily affect the measurement of the material, such as relatively high temperatures of the material. Because of such high temperatures the support members of the measuring device can shift in the direction of the heat source. Another problem is that changes in position or misalignment can occur because of skewing of the webs being measured. Still another disadvantage occurs in measuring the cross-section of continuously moving webs of material, since the required optoelectronic measuring devices are cumbersome or are mechanically very complicated. In such optoelectronic measuring devices the measuring stirrup or bracket with a traversing measuring head would be very complicated because of the necessary strict dimensional requirements.

Therefore, it is primary object of the present invention to avoid the disadvantages of the above-mentioned measuring devices while achieving a particularly high measuring accuracy.

In accordance with the present invention, the thickness of a moving web of material is controlled by passing the web through a production station containing a final control or regulating element for the web thickness and positioning a radiometric device for measuring the weight per unit area of the web closely spaced downstream from the production station. After the radiometric measurement is effected, the material is passed further downstream and a second measured value is obtained by an optoelectronic device which measures the web thickness utilizing laser radiation. The two measured values are introduced into a comparison device where the radiometric measurement is corrected by the value obtained in the optoelectronic measuring device. The comparative corrected value thus obtained is delivered as the actual value to a control unit which is known per se and which actuates the final control element for the web thickness in the production station.

If, in a further feature of the invention, the density of the web of material being measured is to be controlled, a final control element for the density is also positioned in the production station. In such an arrangement, based on the comparative value obtained in consideration of the type of material forming the web, the density of the material of the web is determined in a computer, known per se, and the obtained value is transmitted as the actual value to a control unit also known per se which, in turn, controls the final control element for the density.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a diagrammatic illustration of the method embodying the present invention.

DETAIL DESCRIPTION OF THE INVENTION

In the drawing, a web of material 1 to be measured is passed through a production station containing a final control element for the thickness of the material and another final control element for its density. After exiting from the production station, the web is moved continuously first past a radiometric device and then further downstream past an optoelectronic device.

In the radiometric device the weight per unit area of the web is measured and the measured value is transferred to a comparison device. The radiometric device is positioned closely adjacent the production station, while the optoelectronic device is positioned at a location downstream from the production station where it is not exposed to any significant environmental influences present adjacent the production station.

As the web passes the optoelectronic device its thickness is measured by means of laser radiation and the measured value is transmitted into the comparison device. Within the comparison device the radiometric measurement is corrected by the optoelectronic measurement and the comparative corrected value is transmitted to a known control unit which, in turn, if necessary, actuates the final control element for thickness of the web located in the production station.

As can be appreciated from the above description, the radiometric measuring device can be positioned close to the production station, because it is robust and is not susceptible to environmental influences. The production station may, for example, be an adjustable roller housing or frame. The disadvantages of the radiometric measuring device which are inherent and are described above, are avoided by utilizing the advantages of the optoelectronic measuring device by using the measured value from this device which is independent from the position of the material, as the correction value for the radiometrically measured value. The optoelectronic device can be easily located at a position downstream from the production station in the path of movement of the web where the various environmental influences are no longer significant. If the space between the two measuring units along the path travel of the web is so large that the composition of the material changes along the path of travel, the measured value of the radiometric device can be stored until the portion of the web measured by it reaches the measuring range of the optoelectronic device. If the composition of the material in the web remains constant over its width or if its possible variation is negligible, the radiometric device for obtaining the measured values can traverse the width of the web, while the optoelectronic device is maintained stationary. In these various arrangements, due to the closeness of the radiometric device to the production station, a short idle time is involved while a significant increase in the measuring accuracy is obtained. Therefore, in accordance with the present invention, the combined advantages of both measuring devices are achieved while avoiding their attendant disadvantages.

Therefore, in accordance with the method of the present invention, the thickness of the webs composed of several components can be advantageously controlled, where the ratio of the individual components relative to one another may change as, for example, in metal alloys and other materials produced of components having different atomic numbers.

Further, the method embodying the present invention can be used advantageously for controlling the thickness of impregnated materials coated on one or both sides where such materials are doubled over once or several times, such as multiple layer plastic materials, multiple layers of metals, or metals which are coated with lacquer or plastics material.

The present invention can also be utilized in controlling the thickness of materials which have varying density. Under such an operation, based on the measured values in a known computer operation the density can be simultaneously determined and regulated. Such an operation is advantageous for measuring webs of foam materials, paper, plastics materials, rubber, asbestos cement and other voluminous materials.

While specific embodiments of the invention have been shown and described in detail to illustrate the application of the inventive principles, it will be understood that the invention may be embodied otherwise without departing from such principles.

What is claimed is:

1. Method of controlling the thickness of moving webs of material comprising the steps of passing the web through a production station containing a final control element for the thickness of the web, locating a radiometric device at the outlet from the production station, after the web leaves the production station moving the web past the radiometric device and, using the device, measuring the weight per unit area of the web, locating an optoelectronic device at a distance from the production station and radiometric device so that the optoelectric device is outside of the range where the web is affected by environmental influences, after the web passes the radiometric device moving the web past the optoelectronic device utilizing laser radiation and measuring the thickness of the web, comparing the measured values from the radiometric device and the optoelectronic device and correcting the measured value of the radiometric device based on the measured value of the optoelectronic device, and conveying the comparative corrected value to a control unit for actuating the final control device for the thickness of the web in the production station.

2. Method, as set forth in claim 1, including arranging in the production station a final control element for the density of the material in the web, computing the density of the material of the web based on the comparative value obtained in the step of comparing the measured values from the radiometric device and the optoelectronic device, transmitting the computed density measurement to a control unit and utilizing the control unit for actuating the final control element for the density of the material in the web.

3. Apparatus for controlling the thickness of a moving web of material comprising means forming a production station, a final control element for the thickness of the web located in the production station, a radiometric measuring device located at the outlet from the production station so that the web moving through the production station can move past said radiometric device for measuring the weight per unit area of the web, an optoelectronic device spaced from said ratiometric device in the downstream path of movement of the web from the production station for measuring the thickness of the web by laser radiation, said optoelectronic device being located outside the range where the web is affected by environmental influences, means for comparing the measured values obtained in said radiometric device and said optoelectronic device for obtaining a comparative corrected value of the measured value of the radiometric device corrected by the measured value of said optoelectronic device and actuating said final control element based on the comparative corrected value.

4. Apparatus, as set forth in claim 3, including a final control element for the density of the material of the web located in said production station, said final control element being in communication with said comparing means for receiving a computed density value therefrom for actuating said final control element for density.

* * * * *